(12) United States Patent
Augenstein et al.

(10) Patent No.: US 8,176,272 B2
(45) Date of Patent: May 8, 2012

(54) INCREMENTAL BACKUP USING SNAPSHOT DELTA VIEWS

(75) Inventors: Oliver Augenstein, Weil i Schoenbuch (DE); Toby Lyn Marek, Santa Clara, CA (US); James Patrick Smith, Redwood City, CA (US); Thomas Prause, Rottenburg (DE)

(73) Assignee: International Business Machines Corporation, Armonk, NY (US)

( * ) Notice: Subject to any disclaimer, the term of this patent is extended or adjusted under 35 U.S.C. 154(b) by 759 days.

(21) Appl. No.: 12/204,758

(22) Filed: Sep. 4, 2008

(65) Prior Publication Data

US 2010/0058010 A1    Mar. 4, 2010

(51) Int. Cl.
*G06F 12/00* (2006.01)
(52) U.S. Cl. ........ 711/162; 711/112; 711/114; 711/156; 707/639; 707/645; 707/646; 707/649; 714/6.1; 714/6.23; 714/6.3
(58) Field of Classification Search .................. 711/162, 711/112, 114, 156; 707/639, 645, 646, 649; 714/6.1, 6.23, 6.3
See application file for complete search history.

(56) References Cited

U.S. PATENT DOCUMENTS

| | | | |
|---|---|---|---|
| 7,069,402 B2 * | 6/2006 | Coulter et al. | 711/162 |
| 7,392,324 B2 * | 6/2008 | Cardone et al. | 709/238 |
| 7,680,767 B2 * | 3/2010 | Adya et al. | 707/999.002 |
| 7,743,028 B1 * | 6/2010 | Stringham et al. | 707/646 |
| 7,756,844 B2 * | 7/2010 | Shoens et al. | 707/695 |
| 2004/0163009 A1 | 8/2004 | Goldstein et al. | |
| 2004/0210608 A1 | 10/2004 | Lee et al. | |
| 2006/0107006 A1 | 5/2006 | Green et al. | |
| 2007/0112895 A1 | 5/2007 | Ahrens et al. | |
| 2007/0234110 A1 | 10/2007 | Soran et al. | |

FOREIGN PATENT DOCUMENTS

WO    WO2007002398 A2    1/2007
* cited by examiner

*Primary Examiner* — Stephen Elmore
(74) *Attorney, Agent, or Firm* — Century IP Group, Inc.; F. Jason Far-hadian, Esq.

(57) ABSTRACT

A backup method that uses snapshot delta views to create backups of a data collection is provided. The method comprises taking a first snapshot of the data collection, in response to determining that a previous snapshot used to create a backup does not exist; creating a backup of the data collection using the first snapshot, in response to determining that the previous snapshot does not exist; recording that the first snapshot was used as a source for the creation of a backup; and taking a second snapshot of the data collection, in response to determining that the previous snapshot that was used as a source for a backup does exist.

13 Claims, 6 Drawing Sheets

*FIG. 1*

|  | Time 1 | Time 2 | Time 3 |
|---|---|---|---|
| Snapshots | .snapshot/snap_1 | .snapshot/snap_1<br>.snapshot/snap_2 | .snapshot/snap_1<br>.snapshot/snap_2<br>.snapshot/snap_3 |
| Delta Views |  | .delta/snap_2/snap_1<br>.delta/snap_1/snap_2 | .delta/snap_2/snap_1<br>.delta/snap_1/snap_2<br>.delta/snap_3/snap_2<br>.delta/snap_2/snap_3 |

INCREMENTAL BACKUP USING SNAPSHOT DELTA VIEWS

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

FIELD OF INVENTION

The present invention relates generally to data management in a computing environment and, more particularly, to incremental backup using snapshot delta views.

BACKGROUND

Efficient and quick backup of data in a storage system presents a challenge as the amount of data to be backed up increases evermore. Incremental backup allows a data management program to produce a backup of an entire data collection once. Future backups are, typically, based on the incremental additions, modifications, or deletions to the files.

Traditional implementations of incremental backup identify added, modified, and deleted files in a data collection by scanning each data file in the data collection. If there are a large number of files, the scanning may take a long time. A data management program may implement incremental backup using a journal mechanism that adds an entry to a log each time a file in a database collection is created, modified, or deleted. The journal, however, may be overwhelmed by a high velocity of changes.

For example, if each file in a large data collection with millions of files is renamed, the journal will attempt to log each filename change in a short period of time (i.e., within the context of a single command). Such an operation may cause the journal to cease functioning or shut down. Using a journal may also be inefficient if a single file is changed multiple times.

Incremental backups always rely on a mechanism to provide a list of files that have changed after the creation of the previous backup. Accordingly, a data management program needs to be used to reconcile the files that may have been changed multiple times to arrive at a final file status (e.g., added, modified, or deleted) for each file. Reconciling multiple changes in a large data collection, however, may take longer than simply scanning each file like in a traditional incremental backup.

More efficient systems and methods for incremental backup are needed that can overcome the aforementioned shortcomings.

SUMMARY

The present disclosure is directed to systems, methods, and corresponding products that facilitate incremental backup using snapshot delta views.

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a data backup method comprises taking a first snapshot of a data collection, in response to determining that no snapshot of the data collection exists for the purpose of creating a backup of the data collection; creating a backup of the data collection based on the first snapshot, in response to creation of the first snapshot; recording that the first snapshot is used as a source for creation of the backup; taking a second snapshot of the data collection, in response to determining that a previous snapshot of the data collection does exist, wherein the previous snapshot was either used as a source for creating a backup or an incremental backup that is currently available.

In one embodiment, the method further comprises generating first and second delta views of the data collection, wherein the first delta view comprises a record of data added or modified since the previous snapshot, and the second delta view comprises a record of data deleted since the previous snapshot; creating an incremental backup of added, modified, or deleted data in the data collection using the first and second delta views, without scanning each data file in the data collection; and recording that the second snapshot is used as a source for creation of the incremental backup.

In accordance with another embodiment, a differential backup method that uses snapshot delta views to create backups of a data collection is provided. The method comprises taking a first snapshot of the data collection, in response to determining that a previous snapshot used to create a backup does not exist; creating a backup of the data collection using the first snapshot, in response to determining that the previous snapshot does not exist; recording that the first snapshot was used as a source for the creation of a backup; and taking a second snapshot of the data collection, in response to determining that the previous snapshot that was used as a source for a backup does exist.

The differential backup method may further comprise creating, automatically, first and second delta views of the data collection, wherein the first delta view provides first information about data added or modified since the previous snapshot and the second delta view provides second information about data deleted since the previous snapshot; and creating a differential backup of added, modified, or deleted data in the data collection using the first and second information, without scanning each data file in the data collection.

In accordance with another embodiment, a system comprising one or more logic units is provided. The one or more logic units are configured to perform the functions and operations associated with the above-disclosed methods. In accordance with yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXEMPLARY EMBODIMENTS

The present disclosure is directed to systems, methods, and corresponding products that facilitate incremental backup using snapshot delta views. In the following, numerous specific details are set forth to provide a thorough description of various embodiments. Certain embodiments may be practiced without these specific details or with some variations in detail. In some instances, certain features are described in less detail so as not to obscure other aspects of the invention. The level of detail associated with each of the elements or features should not be construed to qualify the novelty or importance of one feature over the others.

Figure 1:
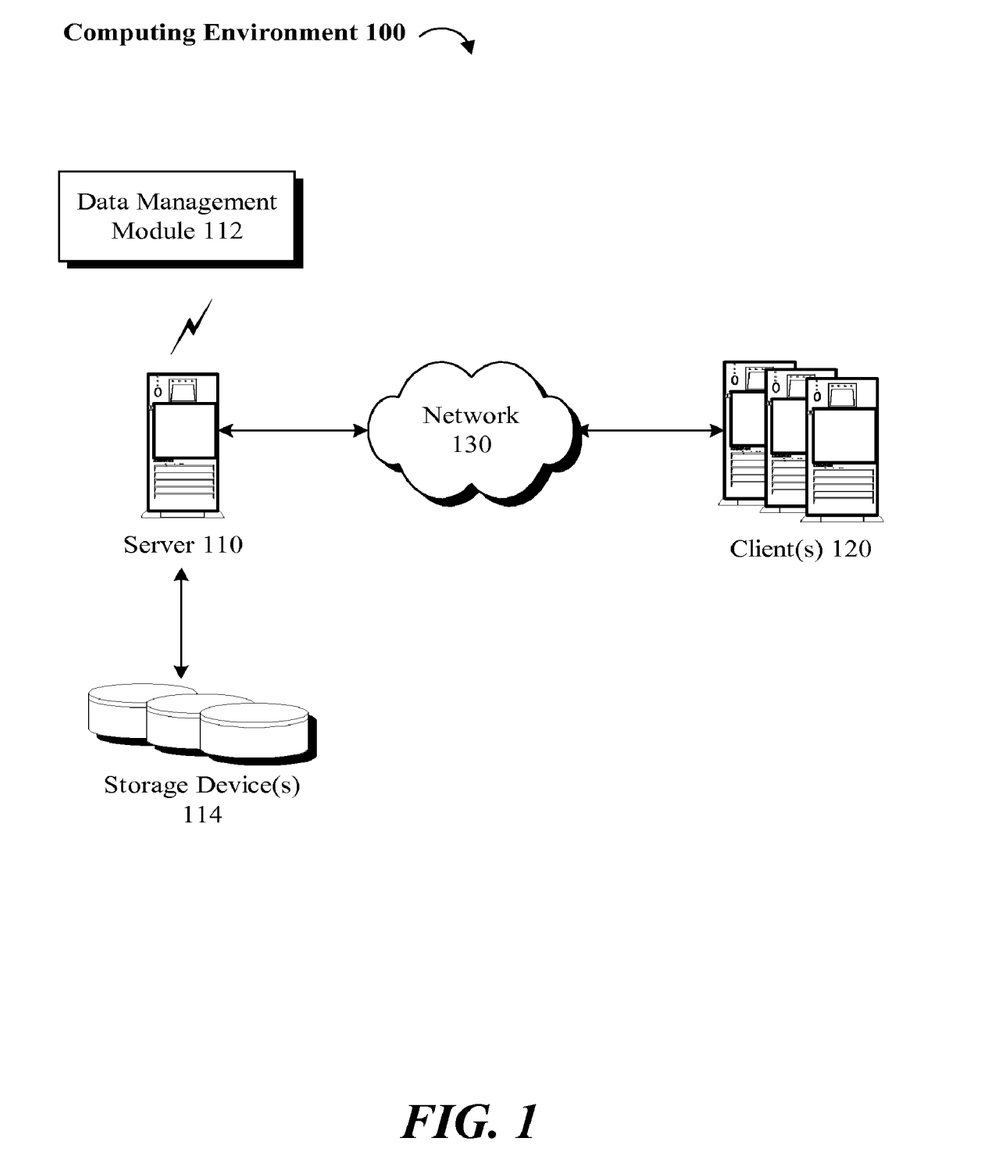
FIG. 1 illustrates an exemplary computing environment, in accordance with one or more embodiments.

Referring to FIG. 1, in accordance with one embodiment, an exemplary computing environment 100 comprises server 110, data management module 112, one or more storage devices 114, one or more clients 120, and network 130. Depending on implementation, clients 120 may be attached directly to storage devices 114, and data management module 112 may run directly on clients 120.

Clients 120 may access data in a file system (not shown) stored on storage devices 114 through server 110 over network 130. File-to-block mappings may be implemented in the file system in the form of data structures (e.g., mapping tables) that associate to each filename an ordered list of blocks where the actual data is stored. Desirably, a disk is logically represented to the file system driver as a set of blocks of identical size.

In one embodiment, the file system driver may utilize some of the blocks to store metadata that maps an ordered list of blocks to each filename. For example, a snapshot mechanism may be used to take a snapshot of a data collection in the file system at a particular point in time. For every snapshot that is created, the file system driver copies a corresponding mapping table, so that data may be looked up through two different mapping tables. One mapping table corresponds to the actual data, and another mapping table corresponds to the data as of creation of the snapshot.

Delta views of the data collection may be created by comparing the two mapping tables to determine which files in the data collection have been added, modified, or deleted. Thus, delta views include a record of changes made to the data collection based on preexisting file-to-block mappings.

In some embodiments, delta views are automatically created when a snapshot is taken. Using file structure information provided by a snapshot and any associated delta views, a data management module 112 may recreate a data collection as of the point in time when the snapshot and delta views were taken. Data management module 112 may be executed over an operating system, or included in data protection software, or in other application software executed on server 110. Data management module 112 may be configured to take snapshots and automatically create delta views of a data collection stored on one or more of storage devices 114.

Figure 2:
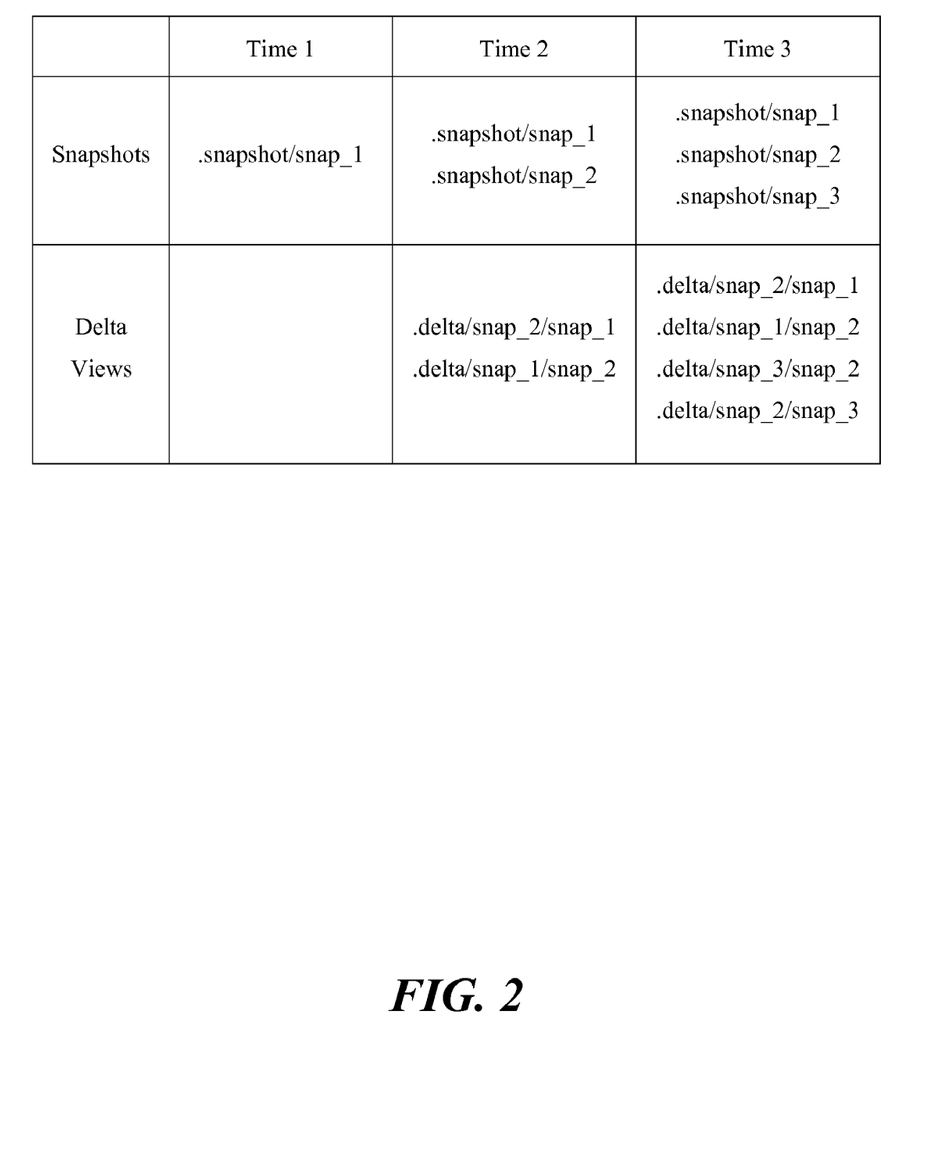
FIG. 2 lists snapshot and delta view directories at different points in time, in accordance with one embodiment.

FIG. 2 lists exemplary snapshot and delta view directories at three different points in time, in accordance with one exemplary embodiment. Storage devices 114 may comprise random access memory (RAM), flash memory, hard disk drives (HDDs), and other storage media. One or more data collections may be stored in storage devices 114. In other embodiments, computing environment 100 may not be implemented using a client-server architecture. That is, the data management module 112 may be executed on one or more computing systems directly, and storage devices 114 may be connected to the computing systems over a local network.

Figure 3A:
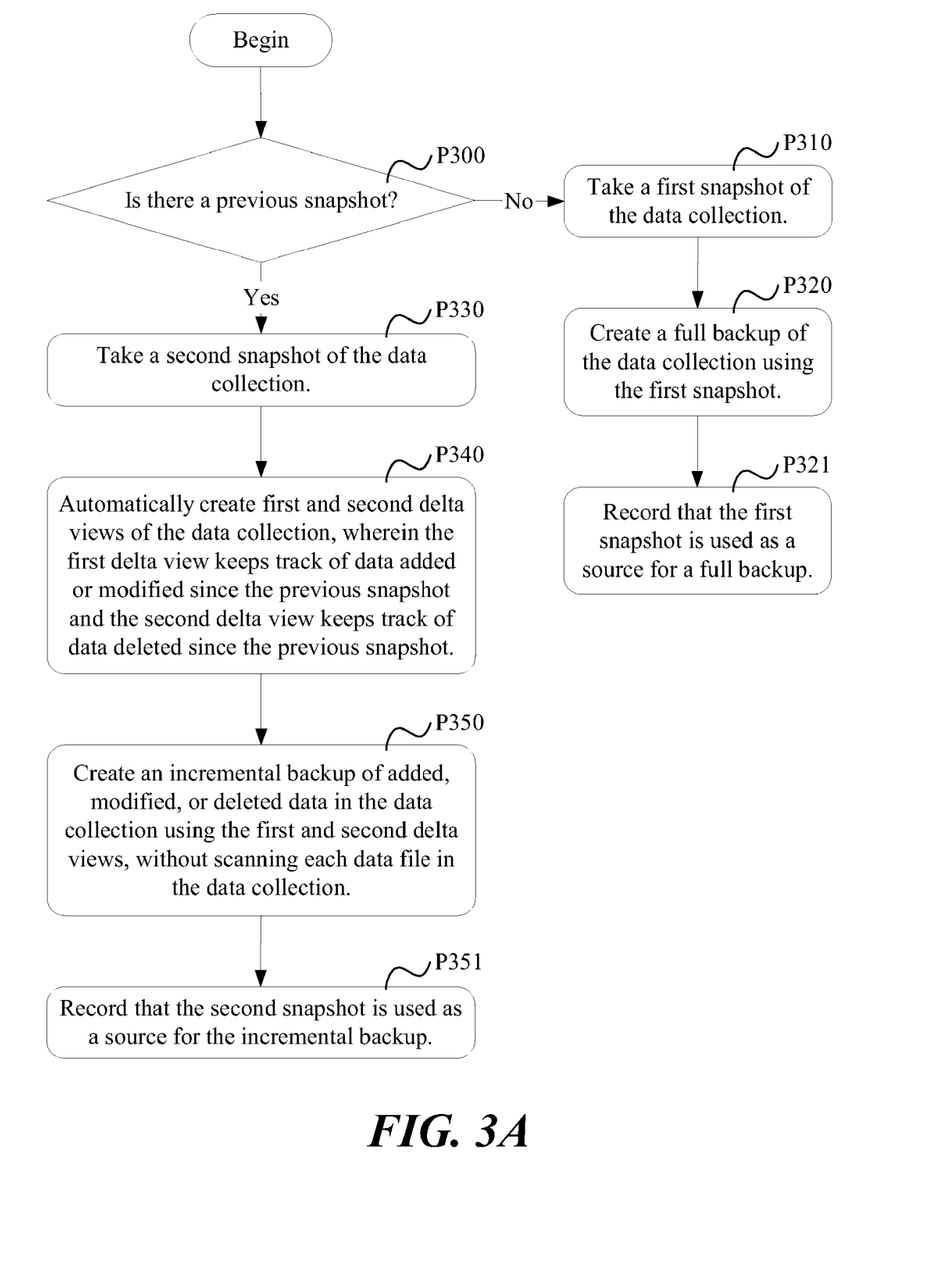
FIG. 3A is a flow diagram of an incremental backup method that uses snapshot delta views, in accordance with one embodiment.

Referring to FIGS. 1 and 3A, in accordance with one embodiment, data management module 112 may create an incremental backup of a data collection stored on storage devices 114. If a previous snapshot of the data collection does not exist (P300), data management module 112 takes a snapshot of the data collection (P310) and then uses the snapshot to create a full or partial backup of the data collection (P320). The snapshot is recorded as a source for a backup (P321). If a previous snapshot does exist (P300), data management module 112 takes another snapshot of the data collection (P330) and automatically creates one or more delta views, depending on implementation. In one embodiment, a first delta view includes a record of data added or modified since the previous snapshot, and another delta view includes a record of files deleted since the previous snapshot (P340).

Advantageously, data management module 112 uses the content of the delta views to create an incremental backup of data added, modified, or deleted since the previous backup without scanning each data file in the data collection (P350). The previous snapshot is recorded as the source for the incremental backup (P351). Depending on implementation, data management module 112 may delete the previous snapshot along with any associated delta views upon creating the incremental backup.

Figure 3B:
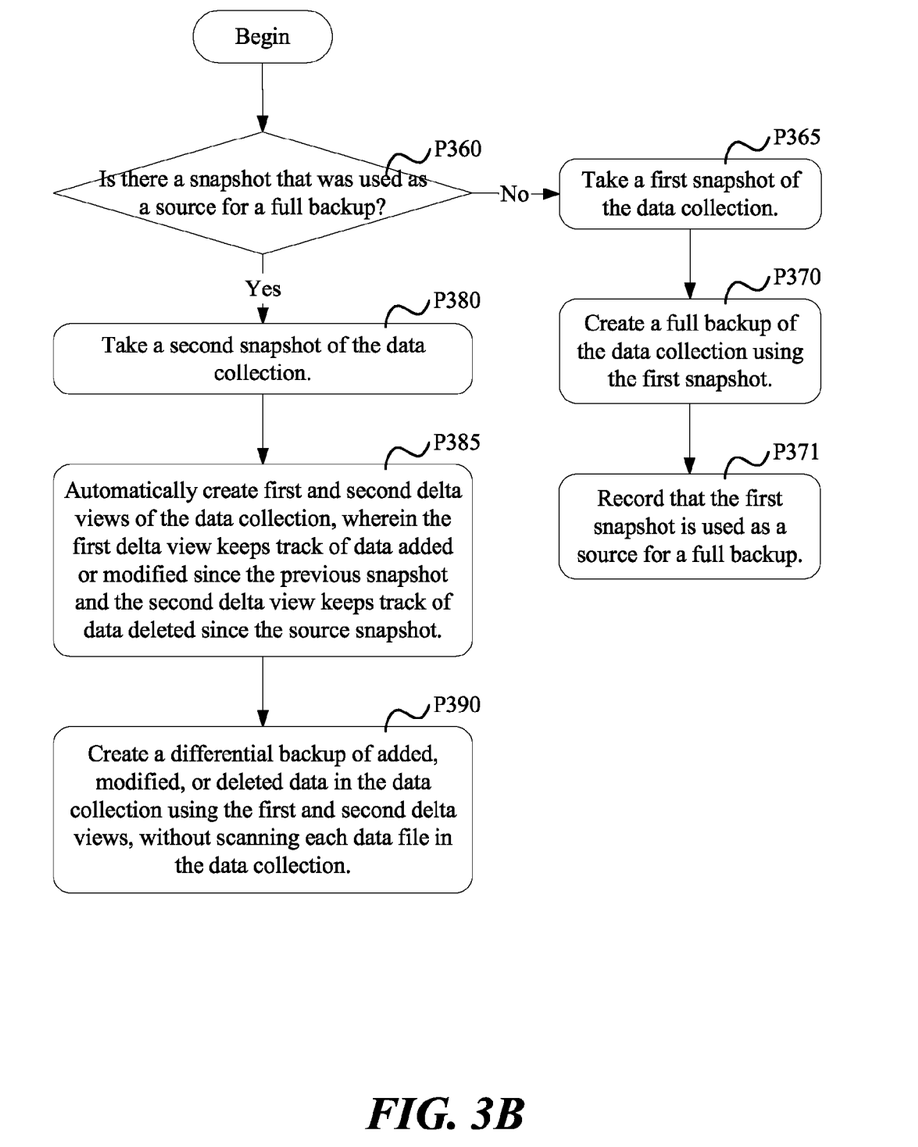
FIG. 3B is a flow diagram of a differential backup method that uses snapshot delta views, in accordance with one embodiment.

Referring to FIG. 2B, in accordance with another embodiment, data management module 112 may create a differential backup of a data collection. The processes for creating a differential backup are similar to processes listed in P300-P351 for creating an incremental backup. However, instead of searching for the previous snapshot (P300), data management module 112 searches for the snapshot that was used as a source for a backup of the data collection (hereafter "source snapshot").

If the source backup does not exist (P360), data management module 112 takes a snapshot of the data collection (P365) and then uses the snapshot to create a backup of the data collection (P370). The snapshot is recorded as a source for a backup (P371). If a source snapshot does exist (P360), data management module 112 takes another snapshot of the data collection (P380) and automatically creates one or more delta views, depending on implementation.

In one embodiment, a first delta view includes a record of data added or modified since the previous snapshot, and another delta view includes a record of files deleted since the source snapshot (P385). Advantageously, data management module 112 uses the content of the delta views to create a differential backup of data added, modified, or deleted since the previous backup without scanning each data file in the data collection (P390).

Data management module 112 may also be configured to take incremental sub-file snapshots, wherein delta views may be used to create sub-file backups of the modified data. The delta views may comprise files (i.e., sparse files) which exclusively include the modified data, for example. It is noteworthy that, for each sparse file, the size of the new and previous version may be considered because incremental sub-file backups may be limited to the portion of the file that fits into a predetermined length.

In one embodiment, a sparse file presented in the delta view is an exclusive-or image of a source and a corresponding target, and may be generated from the filesystem layer by comparing the mapping tables of the two respective snapshots. Blocks that are simultaneously referenced from both mapping tables translate to a zero block. Blocks that differ in both representations are presented by exclusive-oring the blocks corresponding to both sources. A file may be fully backed up, if the new version is larger. The file may be truncated, if the new version is smaller.

In one embodiment, a sub-file backup may be created by applying an exclusive-or operation to a sparse file (e.g., sub-file delta view). The exclusive-or operation converts the blocks in the sparse file that have not been altered to zeros, without any requirement for additional physical storage. The backup may be compressed to reduce the large number of zero's in the file efficiently. A sub-file backup may be restored by restoring a previous sub-file snapshot, decompressing the sub-file backup if compressed, and applying an exclusive-or operation to the previous sub-file snapshot with the sub-file backup.

Depending on implementation, some snapshots may not be used as a source for incremental backup. As such, since snapshots may be used for purposes other than data recovery, data management module 112 may differentiate between snapshots used for data recovery and other snapshots using different naming conventions. For example, in one embodiment, some snapshots may be used for local backup. Such snapshots may be created frequently to provide a fast recovery mechanism.

Some snapshots may not be moved to a secondary storage media and hence may not provide the same level of protection as a tape backup. Some snapshots may be used as a source for a backup to a secondary storage media and thereby also be used as a fast recovery mechanism. Such snapshots, however, may be created less frequently. It is noteworthy that terms incremental or differential backup within the context of this disclosure refer to the backup to a secondary storage media. To create an incremental or differential backup, it is determined which files have been changed since a certain point in time. A list of the modified files can be obtained using delta views, if the snapshot that was used as a source for the previous backup is available.

In different embodiments, the invention may be implemented either entirely in the form of hardware or entirely in the form of software, or a combination of both hardware and software elements. For example, computing environment 100 may be presented largely in terms of hardware components and software code executed to perform processes that achieve the results contemplated by the system of the present invention.

Figure 4:
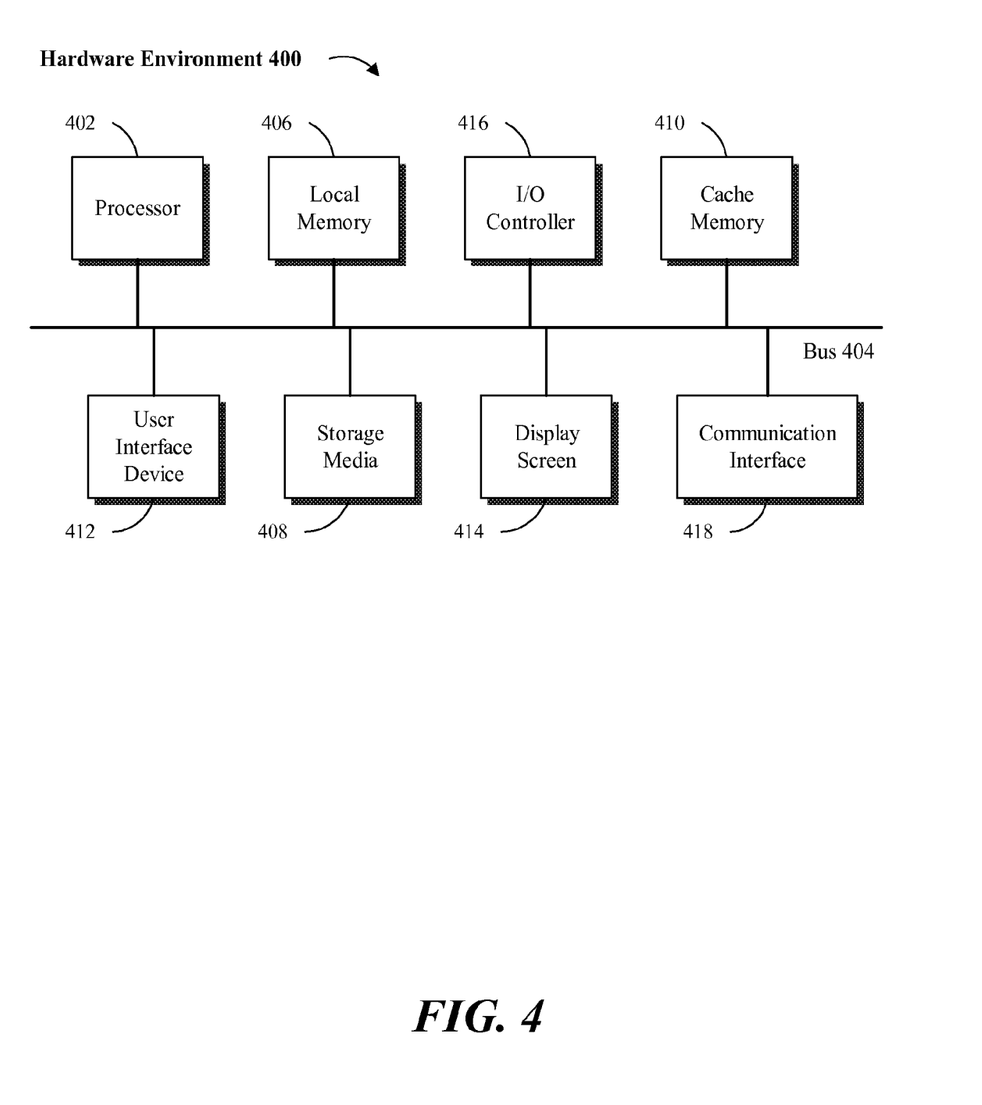
FIGS. 4 and 5 are block diagrams of hardware and software environments in which a system of the present invention may operate, in accordance with one or more embodiments.
Figure 5:
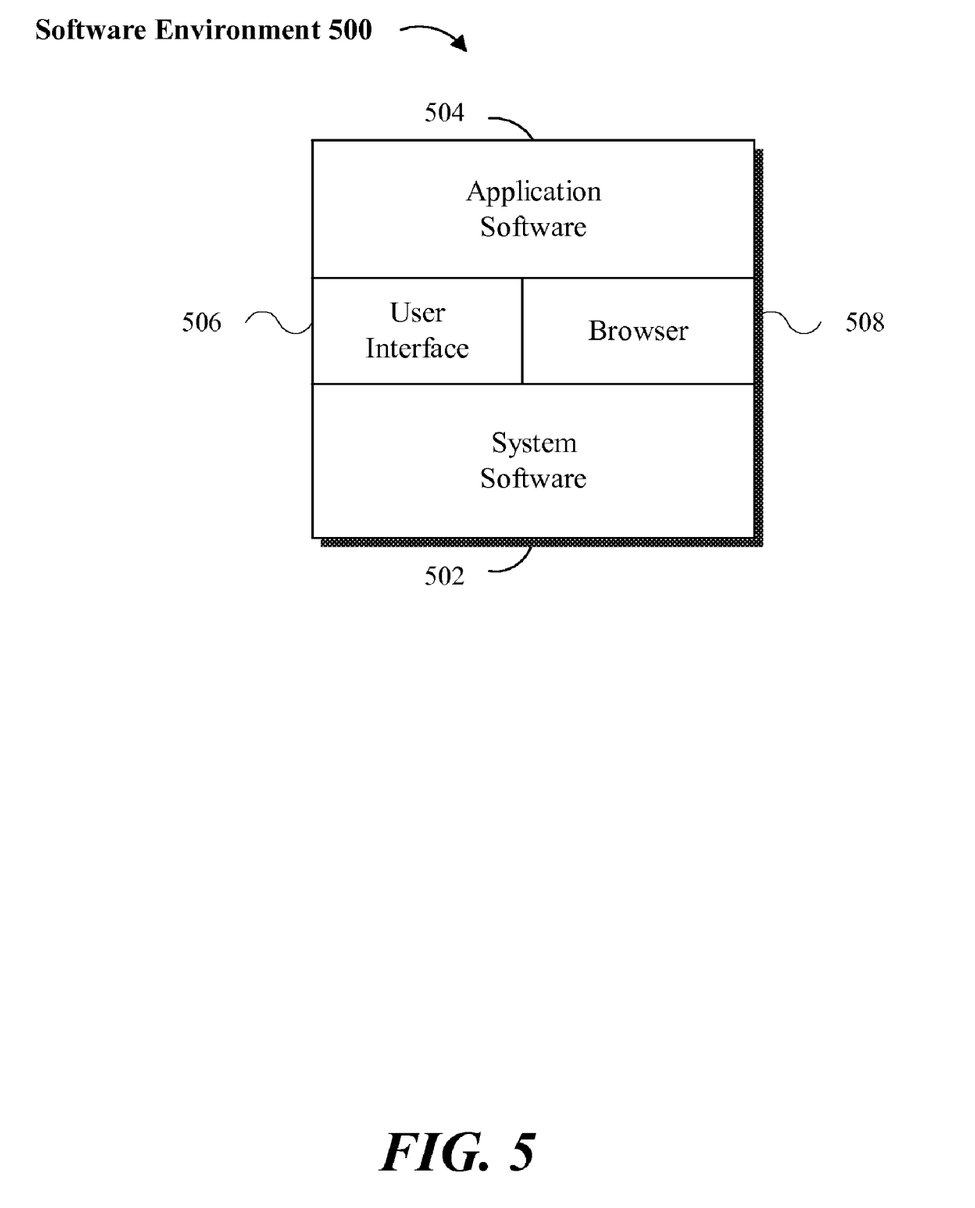

Referring to FIGS. 4 and 5, computing environment 100 in accordance with an exemplary embodiment may be composed of a hardware environment 400 and a software environment 500. The hardware environment 400 comprises the machinery and equipment that provide an execution environment for the software; and the software provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 500 is divided into two classes comprising system software 502 and application software 504. System software 502 comprises control programs, such as the operating system (OS) and information management systems that instruct the hardware how to function and process information.

In one embodiment, data management module 112 may be implemented as system software 502 or application software 504 executed on one or more hardware environments to facilitate memory sharing among networked computing systems. Application software 504 may comprise but is not limited to program code, data structures, firmware, resident software, microcode or any other form of information or routine that may be read, analyzed or executed by a microcontroller.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate or transport the program for use by or in connection with the instruction execution system, apparatus or device.

The computer-readable medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital videodisk (DVD).

Referring to FIG. 4, an embodiment of the system software 502 and application software 504 may be implemented as computer software in the form of computer readable code executed on a data processing system such as hardware environment 400 that comprises a processor 402 coupled to one or more computer readable media or memory elements by way of a system bus 404. The computer readable media or the memory elements, for example, can comprise local memory 406, storage media 408, and cache memory 410. Processor 402 loads executable code from storage media 408 to local memory 406. Cache memory 410 provides temporary storage to reduce the number of times code is loaded from storage media 408 for execution.

A user interface device 412 (e.g., keyboard, pointing device, etc.) and a display screen 414 can be coupled to the computing system either directly or through an intervening I/O controller 416, for example. A communication interface unit 418, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 400 may not include all the above components, or may comprise other components for additional functionality or utility. For example, hardware environment 400 may be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In certain embodiments of the system, communication interface 418 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 5, system software 502 and application software 504 may comprise one or more computer programs that are executed on top of an operating system after being loaded from storage media 408 into local memory 406. In a client-server architecture, application software 504 may comprise client software and server software. For example, in one embodiment of the invention, client software is executed on one or more computing systems and server software is executed on a server system (not shown).

Software environment 500 may also comprise browser software 508 for accessing data available over local or remote computing networks. Further, software environment 500 may comprise a user interface 506 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods, and the order in which the respective steps of each method are performed are purely exemplary. Depending on implementation, the steps may be performed in any order or in parallel, unless otherwise indicated otherwise in the present disclosure. Further, the logic code is not related, or limited to any particular programming language, and may comprise of one or more modules that execute on one or more processors in a distributed, non-distributed or multi-processing environment.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A method for execution on one or more processors, the method comprising:
    taking a first snapshot of a data collection, in response to determining that no snapshot of the data collection exists for the purpose of creating a backup of the data collection;
    creating a backup of the data collection based on the first snapshot, in response to creation of the first snapshot;
    recording that the first snapshot is used as a source for creation of the backup;
    taking a second snapshot of the data collection, in response to determining that a previous snapshot of the data collection does exist, wherein the previous snapshot was either used as a source for creating a backup or an incremental backup that is currently available;
    generating first and second delta views of the data collection, wherein the first delta view comprises a record of data added or modified since the previous snapshot, and the second delta view comprises a record of data deleted since the previous snapshot;
    creating an incremental backup of added, modified, or deleted data in the data collection using the first and second delta views, without scanning each data file in the data collection; and
    recording that the second snapshot is used as a source for creation of the incremental backup.

2. The method of claim 1, further comprising deleting the previous snapshot.

3. The method of claim 1, further comprising taking sub-file snapshots, wherein delta views may comprise sparse files including the modified data.

4. The method of claim 1, further comprising differentiating between snapshots used for data recovery and other snapshots via a naming convention.

5. A differential backup method for execution on one or more processors that uses snapshot delta views to create backups of a data collection, the method comprising:
    taking a first snapshot of the data collection, in response to determining that a previous snapshot used to create a backup does not exist;
    creating a backup of the data collection using the first snapshot, in response to determining that the previous snapshot does not exist;
    recording that the first snapshot was used as a source for the creation of a backup;
    taking a second snapshot of the data collection, in response to determining that the previous snapshot that was used as a source for a backup does exist;
    creating, automatically, first and second delta views of the data collection, wherein the first delta view provides first information about data added or modified since the previous snapshot and the second delta view provides second information about data deleted since the previous snapshot; and
    creating a differential backup of added, modified, or deleted data in the data collection using the first and second information, without scanning each data file in the data collection.

6. A system comprising one or more processors for creating backups of a data collection, the system further comprising:
    a data management module for taking a first snapshot of a data collection, in response to determining that no snapshot of the data collection exists for the purpose of creating a backup of the data collection;
    wherein a backup of the data collection is created based on the first snapshot, in response to creation of the first snapshot;
    wherein it is recorded that the first snapshot is used as a source for creation of the backup;
    wherein a second snapshot of the data collection is taken, in response to determining that a previous snapshot of the data collection does exist, wherein the previous snapshot was either used as a source for creating a backup or an incremental backup that is currently available;

wherein first and second delta views of the data collection are generated, such that the first delta view comprises a record of data added or modified since the previous snapshot, and the second delta view comprises a record of data deleted since the previous snapshot;

wherein an incremental backup of added, modified, or deleted data in the data collection is created using the first and second delta views, without scanning each data file in the data collection; and wherein it is recorded that the second snapshot is used as a source for creation of the incremental backup.

7. The system of claim 6, wherein the previous snapshot is deleted.

8. The system of claim 6, wherein sub-file snapshots are taken, wherein delta views may comprise sparse files including the modified data.

9. The system of claim 6, wherein snapshots used for data recovery are differentiated with other snapshots via a naming convention.

10. A computer program product comprising a non-transitory data storage medium including logic code, wherein the logic code when executed on a computer causes the computer to:

take a first snapshot of a data collection, in response to determining that no snapshot of the data collection exists for the purpose of creating a backup of the data collection;

create a backup of the data collection based on the first snapshot, in response to creation of the first snapshot;

record that the first snapshot is used as a source for creation of the backup;

take a second snapshot of the data collection, in response to determining that a previous snapshot of the data collection does exist, wherein the previous snapshot was either used as a source for creating a backup or an incremental backup that is currently available;

generate first and second delta views of the data collection, wherein the first delta view comprises a record of data added or modified since the previous snapshot, and the second delta view comprises a record of data deleted since the previous snapshot;

create an incremental backup of added, modified, or deleted data in the data collection using the first and second delta views, without scanning each data file in the data collection; and record that the second snapshot is used as a source for creation of the incremental backup.

11. The computer program product of claim 10, wherein the logic code when executed on a computer further causes the computer to delete the previous snapshot.

12. The computer program product of claim 10, wherein the logic code when executed on a computer further causes the computer to take sub-file snapshots, wherein delta views may comprise sparse files including the modified data.

13. The computer program product of claim 10, wherein the logic code when executed on a computer further causes the computer to differentiate between snapshots used for data recovery and other snapshots via a naming convention.

* * * * *